(12) United States Patent
Nussinson et al.

(10) Patent No.: US 10,697,823 B2
(45) Date of Patent: *Jun. 30, 2020

(54) OPTICAL REMOTE SENSING OF VIBRATIONS

(71) Applicants: Elbit Systems Land and C4I Ltd., Netanya (IL); Soreq Nuclear Research Center, Yavne (IL)

(72) Inventors: Dan Nussinson, Netanya (IL); Aner Lev, Netanya (IL); David Karl, Netanya (IL)

(73) Assignees: Elbit Systems Land and C4I Ltd., Netanya (IL); Soreq Nuclear Research Center, Yavne (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/338,500

(22) PCT Filed: Oct. 2, 2017

(86) PCT No.: PCT/IL2017/051116
§ 371 (c)(1),
(2) Date: Apr. 1, 2019

(87) PCT Pub. No.: WO2018/065982
PCT Pub. Date: Apr. 12, 2018

(65) Prior Publication Data
US 2019/0339117 A1  Nov. 7, 2019

(30) Foreign Application Priority Data

Oct. 9, 2016 (IL) .......................................... 248274

(51) Int. Cl.
*G01H 9/00* (2006.01)
*G01B 9/02* (2006.01)

(52) U.S. Cl.
CPC ........... *G01H 9/00* (2013.01); *G01B 9/02094* (2013.01); *G01H 9/002* (2013.01)

(58) Field of Classification Search
CPC ...... G01H 9/00; G01H 9/002; G01B 9/02094; G01B 9/02084
See application file for complete search history.

(56) References Cited

U.S. PATENT DOCUMENTS

| | | | |
|---|---|---|---|
| 3,782,176 A * | 1/1974 | Jacobs | ..................... G01H 9/00 73/657 |
| 5,838,439 A | 11/1998 | Zang et al. | |
| 2019/0212187 A1 * | 7/2019 | Leizerson | .......... G01B 9/02084 |

OTHER PUBLICATIONS

International Search Report of PCT Application No. PCT/IL2017/051116, dated Jan. 10, 2018.

* cited by examiner

*Primary Examiner* — David Z Huang
(74) *Attorney, Agent, or Firm* — Pearl Cohen Zedek Latzer Baratz LLP

(57) ABSTRACT

Systems and methods are provided, which use at least two coherent light sources with known phase relations between them, which are configured to illuminate a target with at least two corresponding spots, an optical unit comprising a mask and configured to focus, onto a sensor, interfered scattered illumination from the spots of the target, passing through the mask, to yield a signal, at least one shifter configured to shift a frequency of at least one of the coherent light sources to provide a carrier frequency in the signal, and a processing unit configured to derive a vibration frequency of the target from the sensor signal with respect to the carrier frequency. The vibration frequency of the target is separated from the carrier frequency and speckle disturbances may be attenuated or avoided.

17 Claims, 7 Drawing Sheets

OPTICAL REMOTE SENSING OF VIBRATIONS

CROSS-REFERENCE TO RELATED APPLICATIONS

This application is a National Phase Application of PCT International Application No. PCT/IL2017/051116, International Filing Date Oct. 2, 2017, entitled "OPTICAL REMOTE SENSING OF VIBRATIONS", published on Apr. 12, 2018, under publication No. WO 2018/065982, which claims priority of Israel Patent Application No. 248274, filed on Oct. 9, 2016, which is hereby incorporated by reference in its entirety.

BACKGROUND OF THE INVENTION

1. Technical Field

The present invention relates to the field of remotely sensing vibrations, and more particularly, to sensing vibrations remotely using optical means.

2. Discussion of Related Art

Various ways were suggested for sensing vibrations, such various mechanical, acoustic and optical methods; the latter including speckle interferometry and laser Doppler vibrometers.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a system comprising: at least two coherent light sources with known phase relations between them, configured to illuminate a target with at least two corresponding spots, an optical unit comprising a mask and configured to focus, onto a sensor, interfered scattered illumination from the spots of the target, passing through the mask, to yield a signal, at least one shifter configured to shift a frequency of at least one of the coherent light sources to provide a carrier frequency in the signal, and a processing unit configured to derive a vibration frequency of the target from the sensor signal with respect to the carrier frequency.

One aspect of the present invention provides a system comprising: at least one coherent light source configured to illuminate a target, an optical unit comprising a mask and configured to focus, onto a sensor, scattered illumination from the target passing through the mask, to yield a signal, at least one mechanical unit configured to move the mask over an aperture of the optical unit at a specified speed to yield a carrier frequency, and a processing unit configured to derive a vibration frequency of the target from an analysis of the sensor signal with respect to the carrier frequency.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
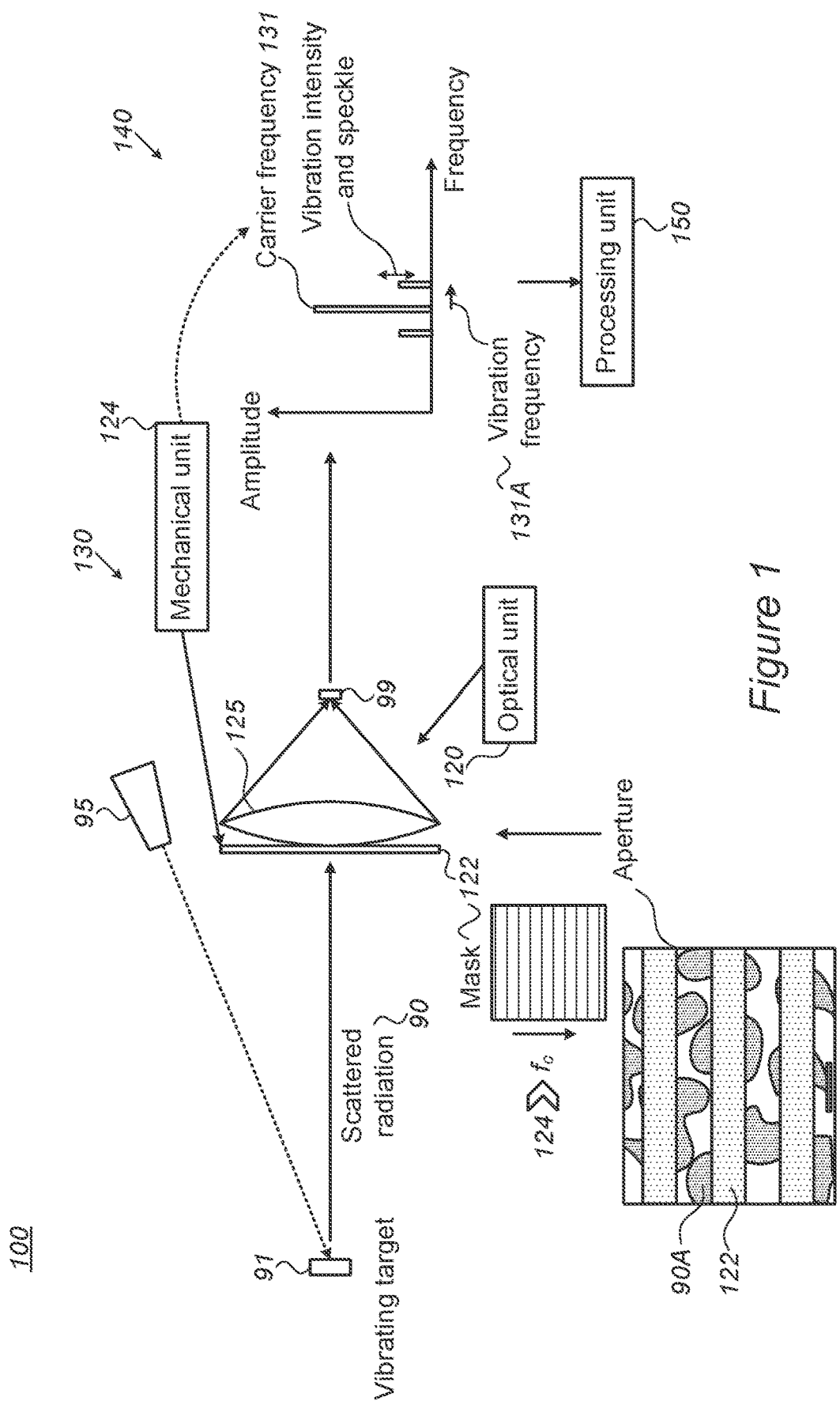
FIG. 1 is a high level schematic block diagram of a system with a moving mask, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

Reflected signals from targets which are illuminated by a laser are characterized by speckle patterns, which are non-uniform intensity patterns resulting from interference of wavefronts of the reflected laser illumination. When targets are vibrating, the reflected speckle patterns move and, when integrated on a detector, result in a signal with fluctuating intensity due to the small changes of the part of the speckle pattern which is integrated in an aperture associated with the detector. Signal fluctuations may be intensified by a mask set at a pupil plane in front of the detector, which provides more entry and exit lines for speckle with respect to the integration area of the signal.

However, disadvantageously, the amplitude of the detected signal fluctuations depends on the characteristics of the speckle pattern (e.g., dimension and density of speckles) and not on the characteristics of the target vibrations. The inventors have found out that the target vibration amplitude that produces a translation larger than 5-10% of mean speckle size, influences the detected signal frequency rather than its amplitude.

FIG. 1 is a high level schematic block diagram of a system 100 with a moving mask 122, according to some embodiments of the invention. System 100 may be configured to detect vibrating elements 91 in a scene and derive parameters relating to their vibrations. System 100 comprises a coherent light source 95 configured to illuminate a target 91, typically by a narrow laser beam, and an optical unit 120 comprising mask 122 and configured to focus, via optical element(s) 125 and onto a sensor 99, scattered illumination 90 from target 91 passing through mask 122, to yield a signal 140.

Starting from a static target 91, illumination 95 causes a speckle pattern 90A (illustrated schematically) in scattered radiation 90, which is collected by optical unit 120 and focused onto detector 99. Detector or sensor 99 may comprise one or more pixels and may be implemented as a single pixel detector. When target 91 vibrates, speckle pattern 90A vibrates as well on the aperture of optical unit 120, resulting in intensity fluctuations on detector 99, which are termed herein "modulation" of the signal. The modulation is at vibration frequency(ies) of target 91. A mask 122 at the aperture may be designed or selected to enhance the amplitude of the modulation, depending on the relation between the geometrical parameters of mask 122, speckle dimensions and vibration amplitude. Therefore, in the prior art, a vibration frequency of target 91 may be derived from the frequencies in the modulation.

Figure 2A:
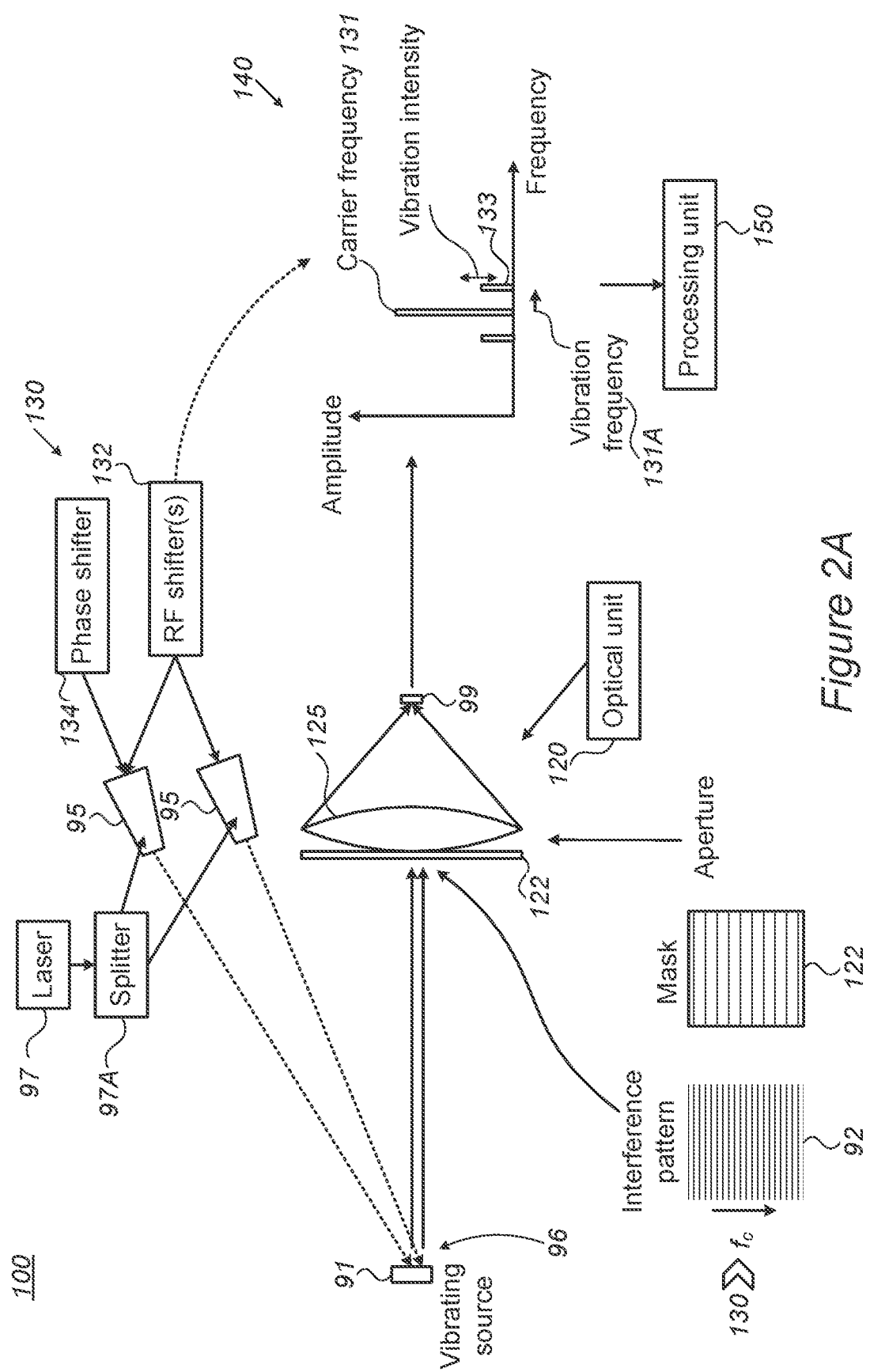
FIGS. 2A and 2B are high level schematic block diagrams of systems with a stationary mask, according to some embodiments of the invention.
Figure 2B:
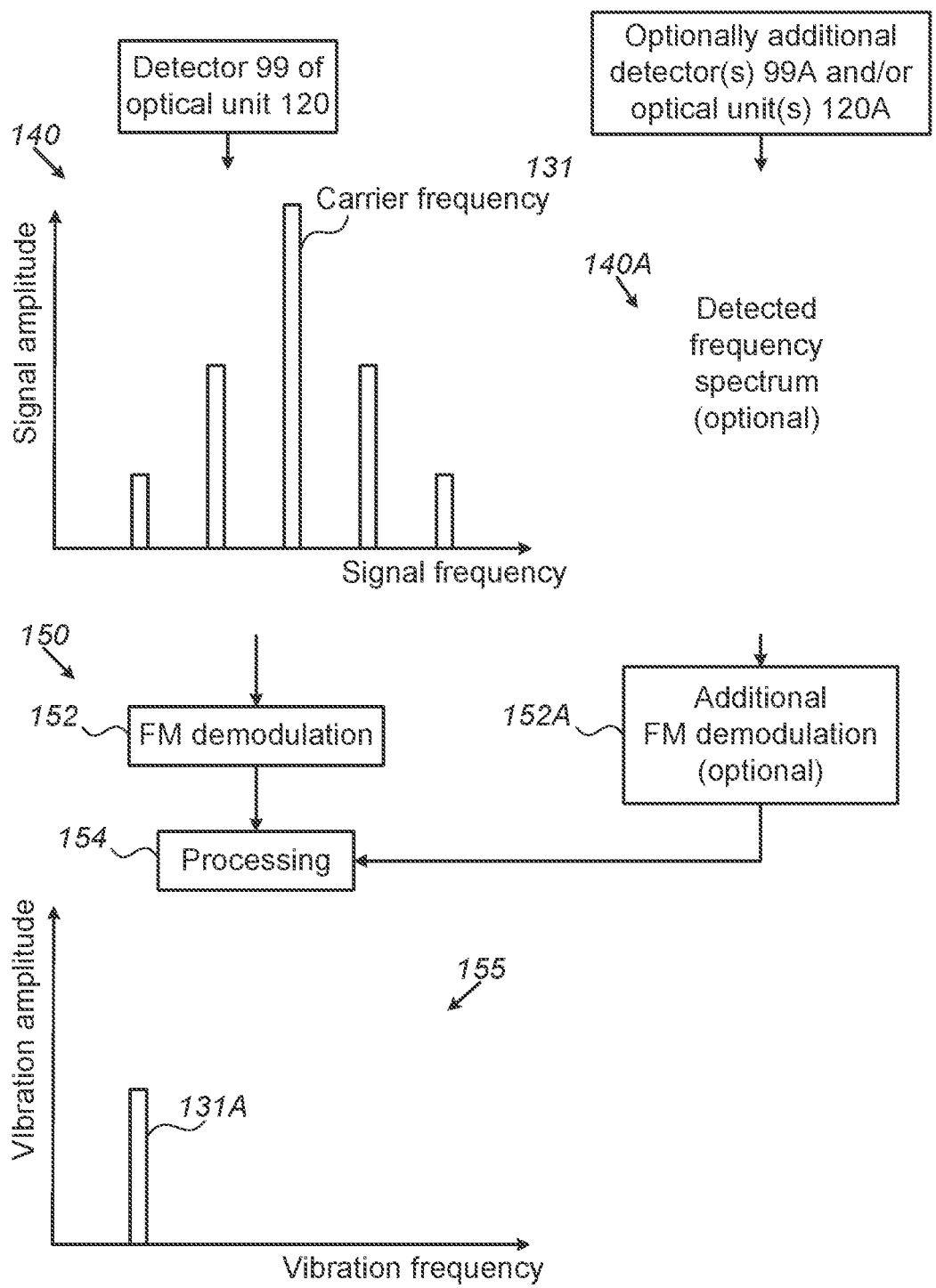

In certain embodiments, mask 122 is moved at a specified speed over the aperture. Assuming a static target, speckle pattern 90A is also static and the motion of mask 122 results in a specified modulation having a specified frequency termed herein the carrier frequency $f_c$, denoted 131 in FIG. 1. Once target 91 vibrates as well, and assuming the carrier frequency is much larger than the vibration frequency(ies) of target 91, $f_c$ is frequency-modulated (FM) by the target vibration frequency (see frequency shift in the frequency domain, denoted by 131A and illustrated schematically as signal 140 in FIG. 1). (It is noted that the spectrum is shown schematically in a non-limiting manner and may include larger side lobes, depending on the modulation index.) The vibration frequency(ies) of target 91 may therefore be extracted from the measured modulation by known methods. It is noted that in these embodiments, mask 122 plays a dual role of amplifying the modulation (resulting from the vibrating speckle pattern) and of providing the carrier frequency; and speckle pattern 90A provides the information about the vibration frequency(ies) of target 91. System 100 further comprises a mechanical unit 124, e.g., a chopper, configured to move mask 122 across the aperture of optical unit 120 at a specified speed to yield and provide the carrier frequency $f_c$. System 100 further comprises a processing unit 150 configured to derive vibration frequency 131A of target 91 from an analysis of sensor signal 140 with respect to carrier frequency 131. Advantageously, the vibration intensity may also be estimated by processing unit 150 from signal 140. Mechanical unit 124 and the carrier frequency $f_c$ may be optimized with respect to required signal amplification and with respect to speckle characteristics FIGS. 2A and 2B are high level schematic block diagrams of system 100 with stationary mask 122, according to some embodiments of the invention. Referring to FIG. 2A, system 100 may be configured to detect vibrating elements 91 in a scene and derive parameters relating to their vibrations. System 100 may comprise at least two coherent light sources 95 with known phase relations between them, which are configured to illuminate target 91 by at least two corresponding spots 96 (indicated schematically). Coherent light sources 95 are further configured to have correlated phases, e.g., be derived from a single coherent light source. In certain embodiments, coherent light sources 95 are derived from a single laser source 97 split by a splitter 97A (see examples in FIGS. 4A-4D below). System 100 may further comprise optical unit 120 comprising static mask 122 and configured to focus, onto sensor 99, interfered scattered illumination from target 91, passing through mask 122, to yield signal 140. Sensor/detector 99 may comprise one or more pixels and may be implemented as a single pixel detector. It is noted that the term vibrations is used in a broad sense to refer to various types of kinetic changes of elements 91, such as any change (e.g., movements, rotations etc.) that causes a change of the relative phase between radiation reflected from spots 96. The relative phase is detectable as described herein and used to detect the respective kinetic change.

Two (or more) illumination sources 95, having correlated phases, are used to illuminate two close areas on target 91 (denoted as spots 96), so that the scattered radiation therefrom interferes on the aperture of optical unit 120 to provide an interference pattern 92 (shown schematically) which is collected to yield detected signal 140. Assuming a static target, interference pattern 92 is static, and speckle pattern 90A is expressed as deformations with respect to a clean interference pattern (see an example in FIG. 3 below). Once target 91 vibrates, interference pattern 92 vibrates as well, resulting in a signal modulation.

Figure 3:
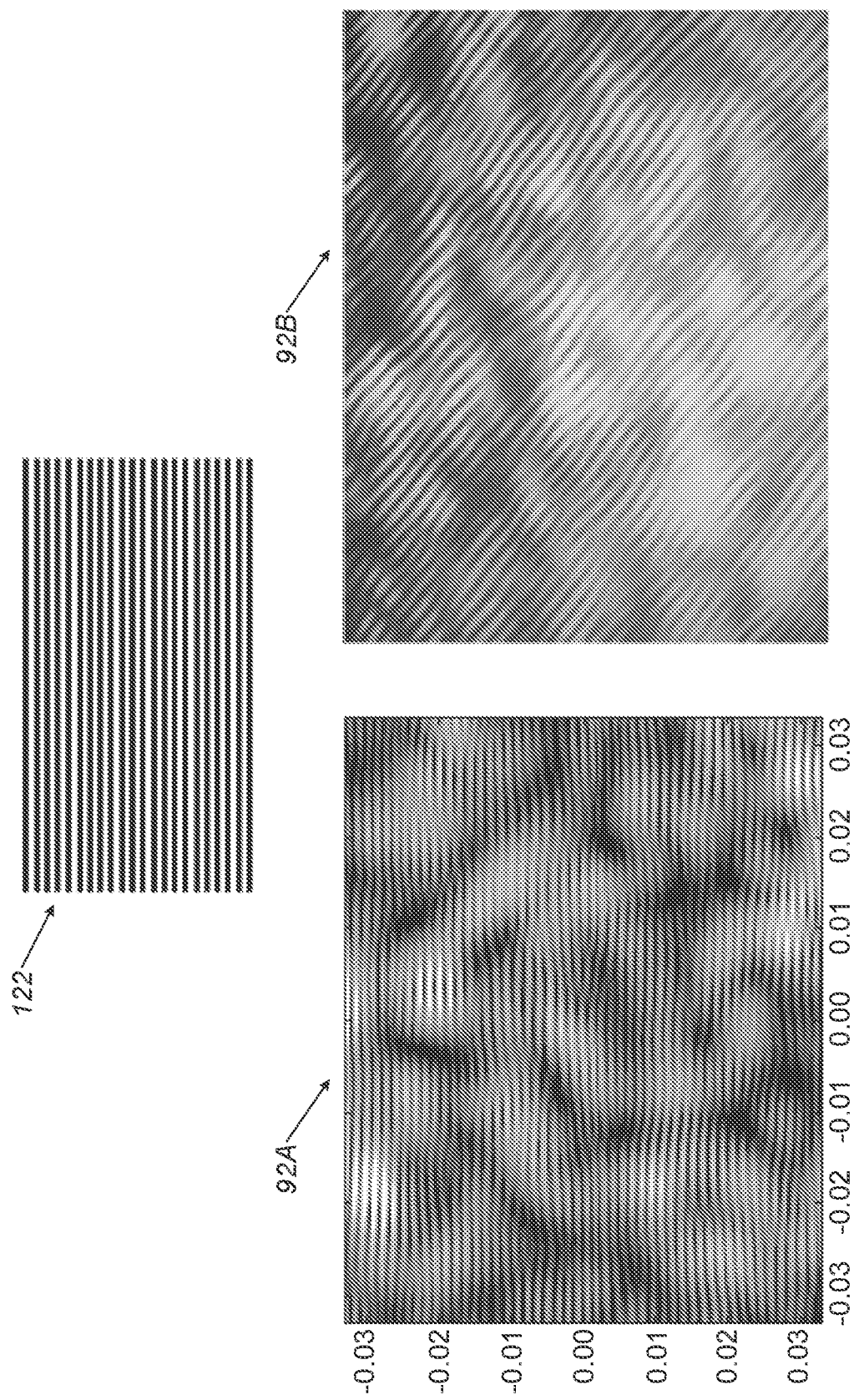
FIG. 3 is an exemplary illustration of interference patterns in simulation and in experiment, according to some embodiments of the invention.

In order to provide frequency modulation, carrier frequency $f_c$ 131 may be generated by controlling the relative phase between illumination sources 95 and/or shifting the frequency of one source 95 with respect to another source 95, to yield carrier frequency $f_c$>>target vibration frequency (ies) 131A. (It is noted that the spectrum is shown schematically in a non-limiting manner and may include larger side lobes, depending on the modulation index.) The modulation, resulting from target vibrations, is turned into a FM modulation of $f_c$ and may be derived by known methods. It is noted that in these embodiments, mask 122 may be selected only to amplify the modulation (resulting from interference pattern 92), and the speckle pattern is merely a disturbance that deforms interference pattern 92, as illustrated in FIG. 3 below.

FIG. 2B illustrates schematically a somewhat more complex signal spectrum 140 having additional vibration frequency harmonics that may be used for FM demodulation 152 followed by further processing 154 by processing unit, leading to identification of vibration frequency 131A in analysis results 155 of the vibration frequencies. In some embodiments, additional detector(s) 99A and/or optical unit(s) 120A (shown schematically) may be used to derive additional spectra 140A which may be FM-demodulated 152A and incorporated in processing 154 and analysis 155.

The inventors have shown in simulation and experimentally, that changing the distance between spots 96 controls the density of interference pattern 92 which in turn changes the intensity of vibration signal 133 but not the modulation. Therefore, increasing the distance between spots 96 improves the SNR (signal to noise ratio). Moreover, diminishing spot size increases the SNR, but also the sensitivity to atmospheric conditions. The inventors have further shown, both analytically and experimentally that, unlike speckle interferometry, disclosed methods measure translational difference between the spots with the same sensitivity as tilt angles of the surface on which the spots fall. The disclosed methods and systems thus combine the advantages of speckle interferometry and laser Doppler vibrometers to provide improved systems. Any of the distance between spots 96, spot sizes, parameters of mask 122, parameters of optical unit 120 and the modulation of illumination sources (i.e., $f_c$) may be optimized with respect to each other to optimize system performance. In certain embodiments, optical unit 120 may be configured to comprise at least one polarizer configured to further improve the SNR, as explained below.

System 100 may comprise at least one shifter 130 such as at least one frequency shifter 132 and/or at least one phase shifter 134, configured to shift the frequency of at least one of coherent light sources 95 according to predetermined shifting characteristics, and processing unit 150 may be configured to derive vibration frequency 131A of target 91 from a relation between sensor signal 140 and the predetermined shifting characteristics. The configuration of shifter(s) 130 to determine carrier frequency $f_c$ is shown schematically in FIG. 2A by an arrow, near interference pattern 92. In embodiments, shifter(s) 130 may comprise at least one RF (radiofrequency) shifter 132 configured to shift an illumination frequency of one or more phase-correlated or possibly phase-locked coherent light source(s) 95 by a predetermined RF frequency 131. The vibration frequency may then be derived from a component 133 in sensor signal 140 at a frequency that is shifted from predetermined RF frequency 131. In embodiments, shifter(s) 130 may comprise at least one phase shifter 134 configured to shift a phase of one or more coherent light source(s) 95 by a predetermined phase shift pattern. The vibration frequency may then be derived from a relation between sensor signal 140 and the predetermined phase shift pattern.

Advantageously, with respect to certain embodiments of mechanical unit(s) 124, system 100 with two or more illumination sources 95 and shifter(s) 130 may comprise fewer or no moving mechanical parts, overcome challenges of designing mask 122 as well as be less sensitive to small speckles. Embodiments illustrated in FIGS. 2A and 2B provide an interferometric approach to vibrations sensing, with all interferometer paths being outside optical unit 120, namely being between illumination sources 95, target 91 and optical unit 120.

FIG. 3 is an exemplary illustration of interference patterns 92 in simulation 92A and in experiment 92B, according to some embodiments of the invention. Mask 122 is illustrated schematically as having parallel straight lines, and interference patterns 92 are shown as derived from simulation 92A and from experiments 92B in an exemplary manner. Speckle pattern 90A is transformed through the use of two illumination sources 95 and interference pattern of the respective reflected radiation, into modulated line patterns which are then focused on detector 99 through mask 122. In the embodiments illustrated in FIGS. 2A and 2B, speckle pattern 90A is expressed in the disturbances in interference pattern and do not convey the information concerning the vibrations of the target. Instead of mechanical modulation with the predetermined modulation characteristics, embodiments with interference patterns may use modulation of illumination sources 95 to enable isolation of a signal proportional to the vibration intensity of target 91, as explained below.

Figure 4A:
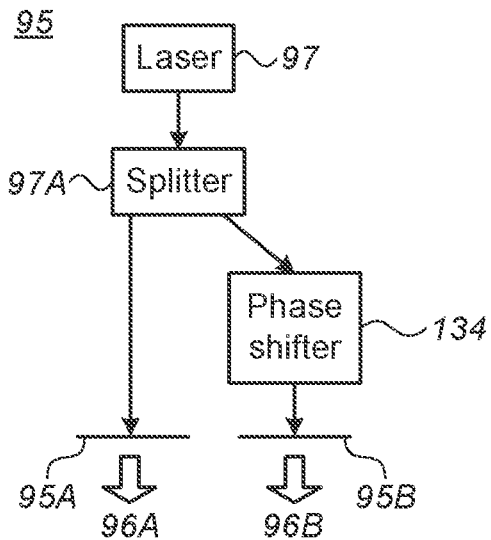
FIGS. 4A-4D are high level block diagrams of illumination sources, according to some embodiments of the invention.
Figure 4B:
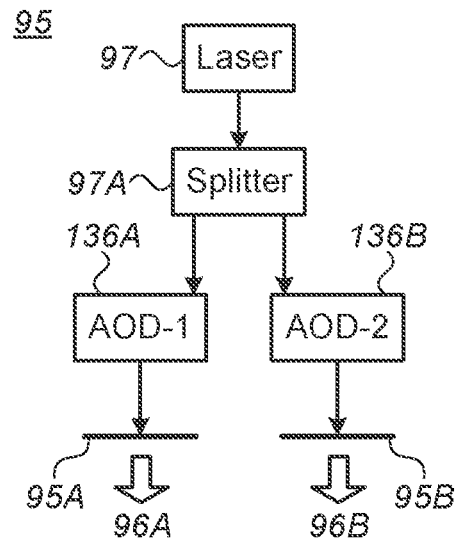
Figure 4C:
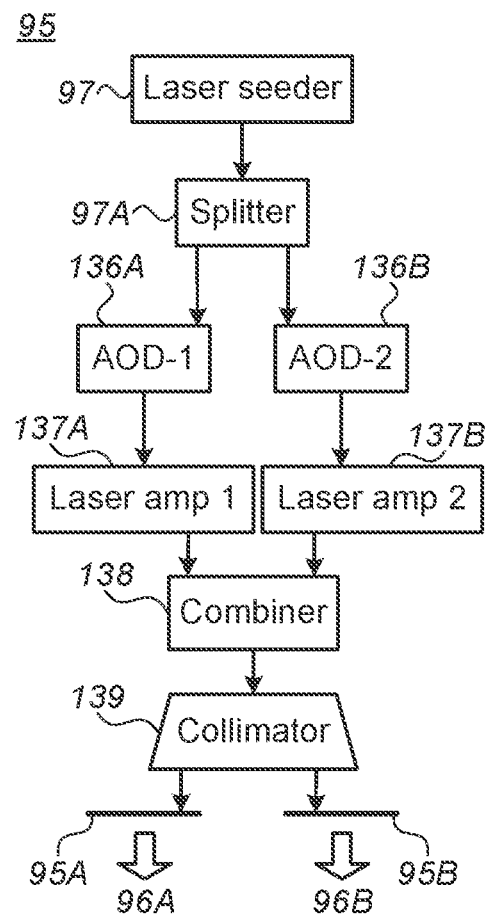
Figure 4D:
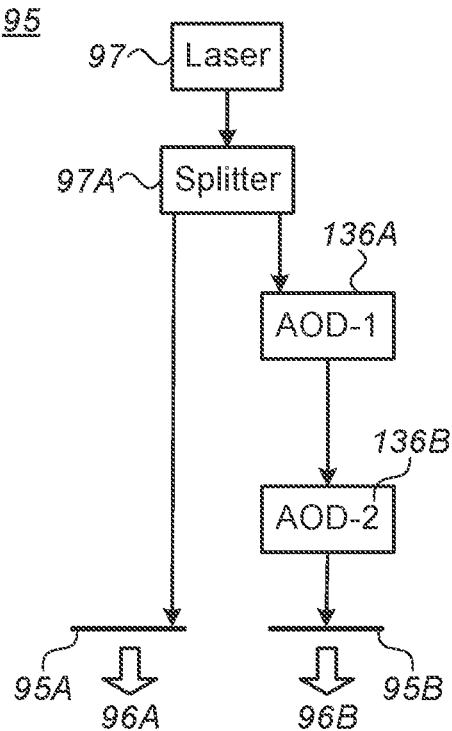

FIGS. 4A-4D are high level block diagrams of illumination sources 95, according to some embodiments of the invention. In certain embodiments, multiple illumination sources 95 may be implemented using a single illumination source 97 which is split (by a splitter 97A) into two or more illumination sources 95A, 95B by a beam splitter 97A, with shifter(s) 130 implemented as one or more phase shifter(s) 134, acousto-optic deflector(s) (AOD) 136A, 136B and/or other optical components. illumination sources 95A, 95B may be configured to provide spots 96A, 96B with specified characteristics of target 91. For example, as illustrated in FIG. 4C, illumination sources 95 may comprise two lasers amplifiers 137A, 137B configured to receive the outputs of AODs 136A, 136B and be phase-locked with laser seeder 97. Illumination from lasers amplifiers 137A, 137B may then be combined by a combiner 138, collimated by a collimator 139 and used as illumination sources 95A, 95B to provide spots 96A, 96B. In an example illustrated in FIG. 4D, both AODs 136A, 136B may be located on one split channel. Elements from FIGS. 4A-4D may be combined to form additional embodiments.

Figure 5:
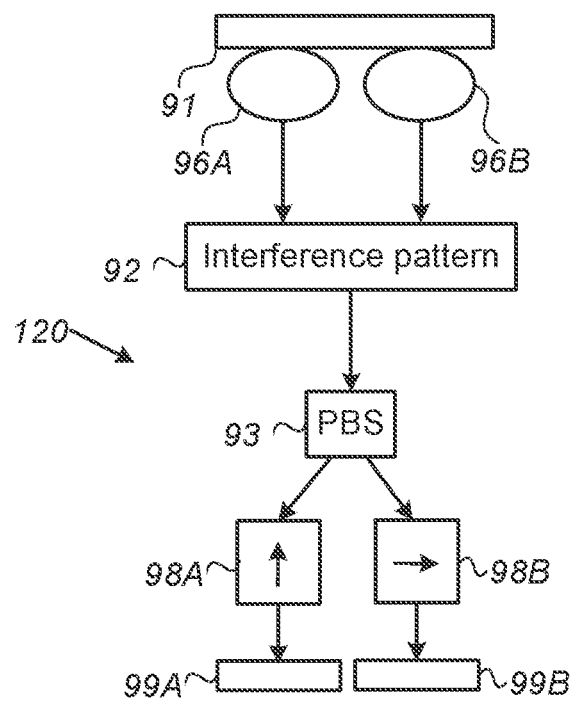
FIG. 5 is a high level block diagram of polarized detection, according to some embodiments of the invention

FIG. 5 is a high level block diagram of polarized detection, according to some embodiments of the invention. In certain embodiments, polarizer(s) 98A, 98B may be implemented to reduce speckle noise. Spots 96A, 96B from target 91 create interference pattern 92 which is then split, e.g., by a polarizing beam splitter (PBS) 93 in optical unit 120 into different polarizations by polarizer(s) 98A, 98B which are detected separately on detector 99 and/or on separate detectors 99A, 99B.

Figure 6:
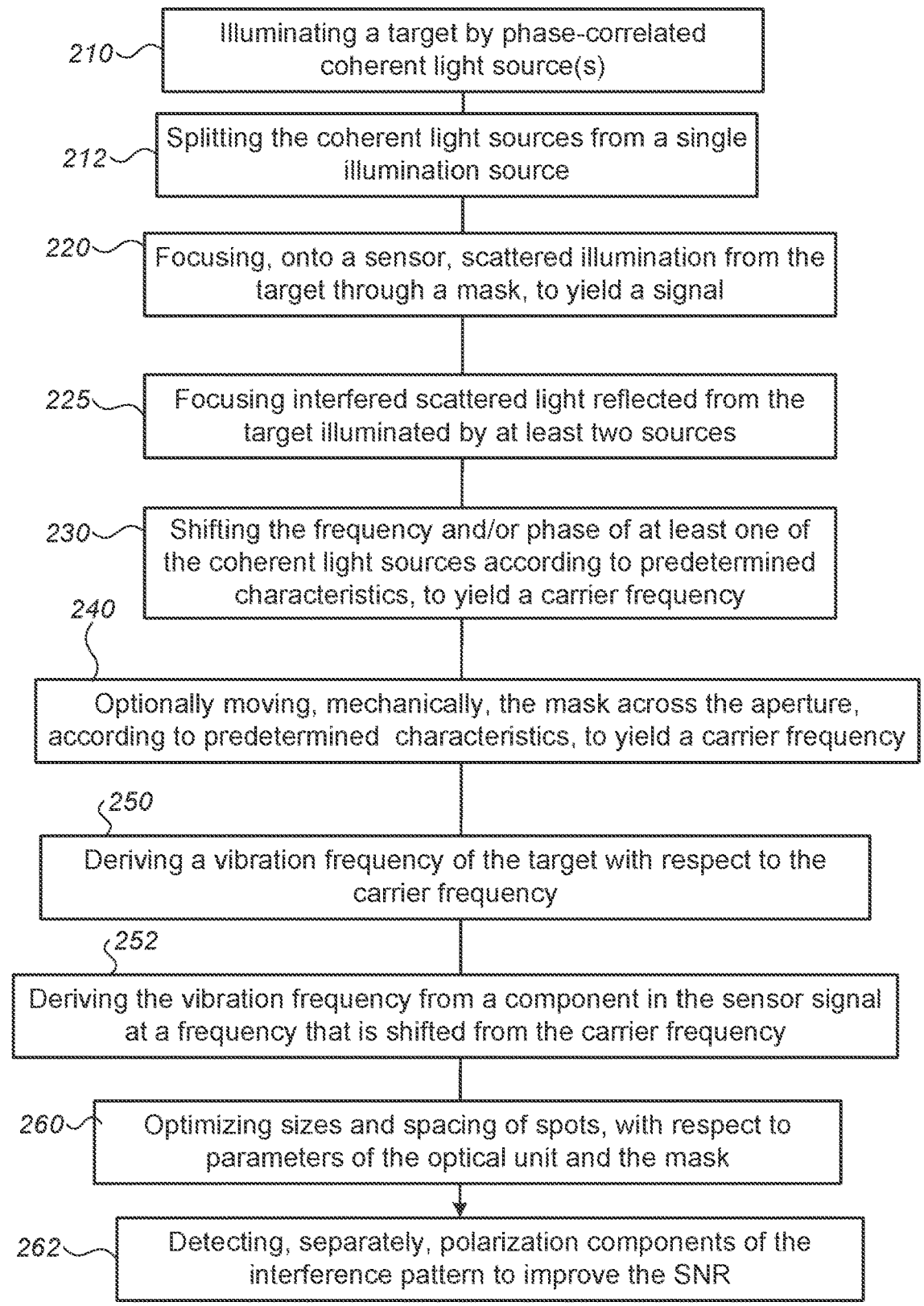
FIG. 6 is a high level flowchart illustrating a method, according to some embodiments of the invention.

FIG. 6 is a high level flowchart illustrating a method 200, according to some embodiments of the invention. The method stages may be carried out with respect to system 100 described above, which may optionally be configured to implement method 200. Method 200 may be at least partially implemented by at least one computer processor. Certain embodiments comprise computer program products comprising a computer readable storage medium having computer readable program embodied therewith and configured to carry out of the relevant stages of method 200. Method 200 may comprise stages for producing, preparing and/or using system 100, such as any of the following stages, irrespective of their order.

Method 200 may comprise illuminating a target by at least two phase-correlated coherent light sources to form at least two corresponding spots (stage 210), possibly splitting the at least two coherent light sources from a single illumination source (stage 212) (see e.g., FIGS. 4A-4D).

Method 200 may comprise focusing, onto a sensor and through a mask, interfered scattered illumination from the spots on the target, to yield a signal (stage 225), shifting a frequency and/or a phase of at least one of the coherent light sources to provide a carrier frequency in the signal (stage 230) and deriving a vibration frequency of the target from the sensor signal with respect to the carrier frequency (stage 250), e.g., from a component in the sensor signal at a frequency that is shifted from the carrier frequency (stage 252), as illustrated e.g., in FIGS. 2A and 2B and in the accompanying description.

Method 200 may further comprise optimizing sizes and spacing of the spots, with respect to parameters of the optical unit and the mask (stage 260). Method 200 may further comprise generating the signal with respect to different polarizations of the interfered scattered illumination, thereby detecting, separately, polarization components of the interference pattern to improve the SNR (stage 262). Method 200 may further comprise configuring the mask with respect to an expected interference pattern of the scattered illumination.

In certain embodiments, method 200 may comprise illuminating the target with one (or more) illumination source(s) (stage 210), focusing, onto the sensor, scattered illumination from the target through the mask, to yield a signal (stage 220), moving, mechanically, the mask across the aperture, according to predetermined characteristics, to yield a carrier frequency (stage 240) and deriving a vibration frequency of the target from an analysis of the sensor signal with respect to the carrier frequency (stage 250) as illustrated e.g., in FIG. 1 and the accompanying description. The mask parameters and movement parameters, as well as illumination and focusing parameters may be optimized with respect to the expected speckle patterns as described above.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system comprising:
    at least two coherent light sources configured to illuminate a target with at least two corresponding spots,
    an optical unit comprising a mask and configured to focus, onto a sensor, interfered scattered illumination from the spots of the target, passing through the mask, to yield a signal, wherein the mask is configured to amplify an amplitude of interfered scattered illumination intensity fluctuations on the sensor,
    at least one shifter configured to shift a frequency of at least one of the coherent light sources to provide a carrier frequency in the signal, and
    a processing unit configured to derive a vibration frequency of the target from the sensor signal with respect to the carrier frequency.

2. The system of claim 1, wherein the at least two coherent light sources have known phase relations between them.

3. The system of claim 1, wherein the at least one shifter is configured to shift a phase of the at least one of the coherent light sources.

4. The system of claim 1, wherein the at least two coherent light sources are split from a single illumination source.

5. The system of claim 1, wherein the optical unit is configured to generate the signal with respect to different polarizations of the interfered scattered illumination.

6. The system of claim 1, wherein the mask is configured with respect to an expected interference pattern of the scattered illumination.

7. The system of claim 1, wherein the mask comprises entry and exit lines for the interfered scattered illumination with respect to an integration area of the interfered scattered illumination on the sensor, thus intensifying fluctuations of the interfered scattered illumination on the sensor.

8. The system of claim 1, wherein the mask comprises parallel straight lines that transform the interfered scattered illumination into modulated line patterns that are focused on the sensor through the mask.

9. A method comprising:
    illuminating a target by at least two coherent light sources to form at least two corresponding spots,
    focusing, onto a sensor and through a mask, interfered scattered illumination from the spots on the target, to yield a signal, wherein the mask is configured to amplify an amplitude of interfered scattered illumination intensity fluctuations on the sensor,
    shifting a frequency of at least one of the coherent light sources to provide a carrier frequency in the signal, and
    deriving a vibration frequency of the target from the sensor signal with respect to the carrier frequency.

10. The method of claim 9, wherein the at least two coherent light sources have known phase relations between them.

11. The method of claim 9, wherein the shifting comprises shifting a phase of the at least one of the coherent light sources.

12. The method of claim 9, further comprising splitting the at least two coherent light sources from a single illumination source.

13. The method of claim 9, further comprising generating the signal with respect to different polarizations of the interfered scattered illumination.

14. The method of claim 9, further comprising configuring the mask with respect to an expected interference pattern of the scattered illumination.

15. The method of claim 9, further comprising optimizing sizes and spacing of the spots with respect to mask parameters.

16. The method of claim 9, wherein the mask comprises entry and exit lines for the interfered scattered illumination with respect to an integration area of the interfered scattered illumination on the sensor, thus intensifying fluctuations of the interfered scattered illumination on the sensor.

17. The method of claim 9, wherein the mask comprises parallel straight lines that transform the interfered scattered illumination into modulated line patterns that are focused on the sensor through the mask.

* * * * *